United States Patent

Ando

[11] Patent Number: 5,565,683
[45] Date of Patent: Oct. 15, 1996

[54] HEAT SOURCE DETECTOR

[75] Inventor: Masaaki Ando, Kyoto, Japan

[73] Assignee: Murata Manufacturing Co., Ltd., Japan

[21] Appl. No.: 349,721

[22] Filed: Dec. 5, 1994

[30] Foreign Application Priority Data

Dec. 3, 1993 [JP] Japan ............................... 5-339410

[51] Int. Cl.$^6$ ............................ G01J 5/00; G08B 13/19
[52] U.S. Cl. .................. 250/342; 250/338.3; 250/349; 250/DIG. 1
[58] Field of Search .................. 250/338.3, 342, 250/330, 332, 334, DIG. 1, 349

[56] References Cited

U.S. PATENT DOCUMENTS

| | | | |
|---|---|---|---|
| 4,064,533 | 12/1977 | Lampe et al. | 250/332 X |
| 4,539,590 | 9/1985 | Gage. | |
| 4,855,932 | 8/1989 | Cangiani et al. | |
| 4,958,077 | 9/1990 | Menke | 250/334 X |
| 5,059,796 | 10/1991 | Nakamura | 250/342 X |
| 5,283,551 | 2/1994 | Guscott | 250/342 X |

FOREIGN PATENT DOCUMENTS

| | | |
|---|---|---|
| 0159840 | 10/1985 | European Pat. Off. |
| 0499320 | 8/1992 | European Pat. Off. |
| 3-41305 | 2/1991 | Japan ..................... 250/338.3 |
| 9203016 | 2/1992 | WIPO . |

OTHER PUBLICATIONS

European Search Report on European Patent Application No. EP- 94-11-8882; Dec. 21, 1995.
Patent Abstracts of Japan, vol. 012 No. 418 (E-678), Nov. 7, 1988 & JP-A-63-15 5975 (Matsuchita Electric Ind. Co. Ltd.); Jun. 29, 1988.

*Primary Examiner*—Carolyn E. Fields
*Assistant Examiner*—Edward J. Glick
*Attorney, Agent, or Firm*—Ostrolenk, Faber, Gerb & Soffen, LLP

[57] ABSTRACT

A heat source detector includes an infrared sensor 1 wherein plural infrared ray sensing elements 7 on which an infrared image is formed by an infrared lens 10 are arranged into an array form; and an infrared analyzer 2 which analyzes a detection signal detected by the infrared ray sensing elements 7. The infrared analyzer 2 has: an infrared intensity detecting unit 3 which detects the infrared intensity for each of the infrared ray sensing elements 7; an infrared center of gravity detecting unit 5 which obtains the center of gravity of a heat source emitting infrared rays, from the infrared intensities detected by the infrared intensity detecting unit 3, and a heat source moving direction detecting unit 6 which obtains the moving direction of the heat source, from temporal vector displacement of the center of gravity obtained by the infrared center of gravity detecting unit 5.

19 Claims, 4 Drawing Sheets

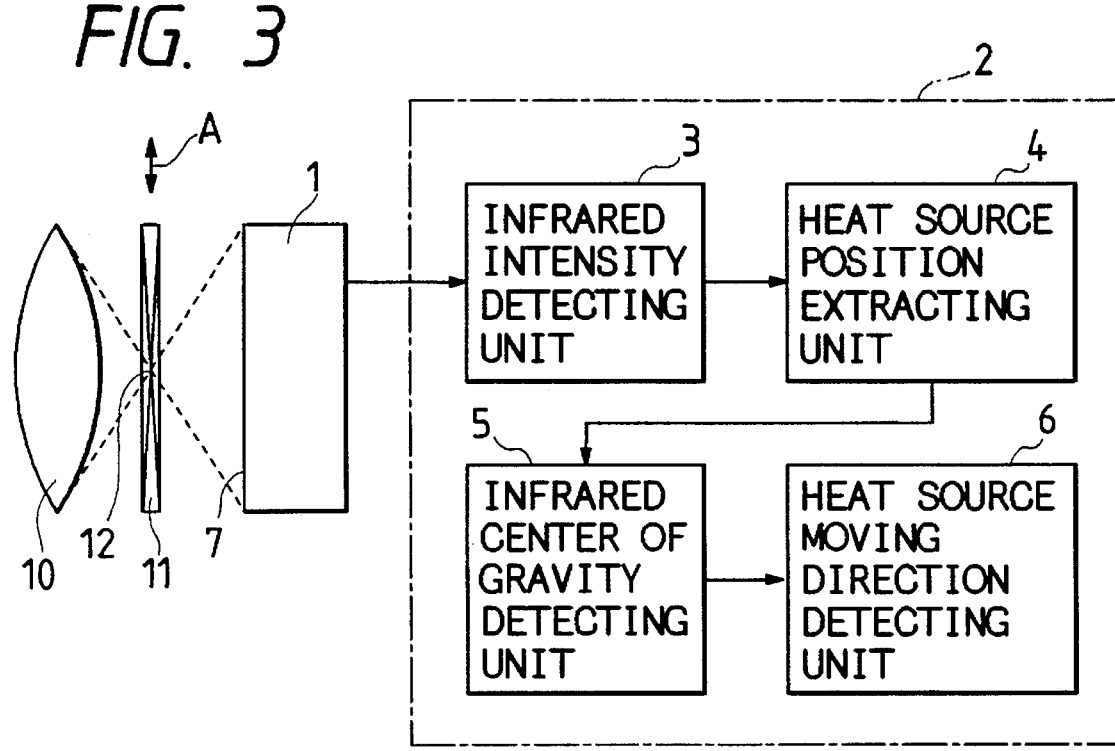
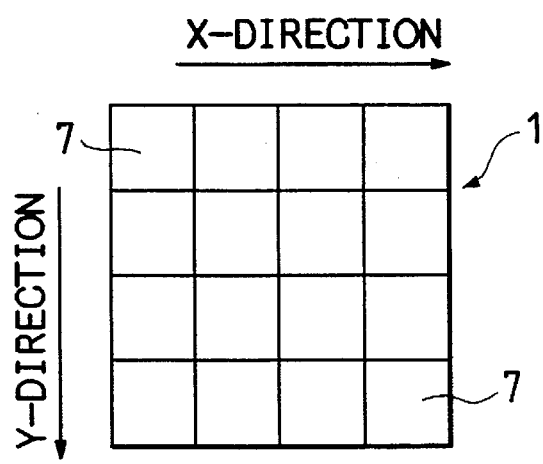
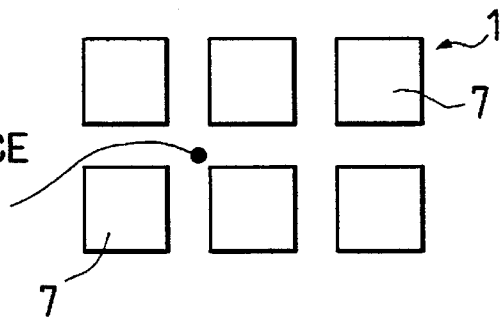

HEAT SOURCE DETECTOR

BACKGROUND OF THE INVENTION

1. Field of the Invention

The present invention relates to a heat source detector which detects a position of an infrared heat source such as a human body and a moving direction of a heat source position.

2. Description of the Related Art

Conventionally, radiation (infrared rays) emitted from an infrared heat source such as a human body is detected by an infrared sensor. An infrared sensor detects a heat source by using a passive method in which no light is irradiated onto an object such as a human body to be detected and radiation spontaneously emitted from a heat source is detected. Therefore, the heat source detection can be conducted without adversely affecting the measuring object such as a human body, and without illumination even during the night. Consequently, such a detection using an infrared sensor has a wide variety of applications.

FIG. 1 shows an example of a conventional heat source detector using an infrared sensor. In the figure, the heat source detector comprises a pyroelectric infrared sensor 1. A shield plate 18 having an aperture 12 is slidably disposed under the infrared sensor 1, and a plurality of Fresnel lenses 16 are arranged under the shield plate 18. In the thus configured detector, an image of radiation from a heat source in each of zones A to C shown in the figure is formed by the Fresnel lenses 16 on an infrared ray sensing device of the infrared sensor 1 so that the heat source is detected. When the aperture 12 of the shield plate 18 is positioned above the zone A as shown in the figure, the zone A constitutes the detection object zone. If a person is in the zone A, for example, an image of radiation from the body of the person is formed on the infrared ray sensing device of the infrared sensor 1, and it is detected that the human body functioning as a heat source is in the zone A. If no person is in the zone A, no radiation is detected. As a result, it is possible to know the presence or absence of a heat source in the zone A.

When the shield plate 18 is slidingly moved so as to be positioned above the zone B and the same operation as that described above is conducted, it is possible in the same manner to know the presence or absence of a heat source in the zone B. Similarly, it is possible also to know the presence or absence of a heat source in the zone C.

When the shield plate 18 is moved at regular time intervals and the presence or absence of a heat source is detected in each of the zones A to C, information can be obtained about the moving direction of a heat source, i.e., whether the heat source is moved from the zone A to the zone C or from the zone C to the zone A.

Another example of a conventional heat source detector using an infrared sensor is shown in FIG. 2(a). The detector has a structure wherein a pyroelectric infrared sensor 1 in which eight infrared ray sensing elements 7 are vertically arranged in a row is mounted so as to be reciprocally rotatable as indicated by an arrow A in the figure, a chopper 11 having an aperture 12 is rotatably mounted in the outer peripheral side of the infrared sensor 1, and an infrared lens 10 is disposed in front of the chopper 11. In the detector, radiation from a heat source passes through the aperture 12 of the chopper 11 and its image is formed on the infrared ray sensing elements 7 by the infrared lens 10. The infrared sensor 1 and the chopper 11 are rotated as indicated by the arrow A and an arrow B, respectively, so that radiation is detected while the chopper 11 conducts an opening operation 64 times, whereby the detection of radiation is conducted while changing the detection angle. Resulting signals are processed by a signal processor 24, and a CPU (microcomputer) 25 operates so as to display infrared images of 64×8 as shown in FIG. 2(b), thereby detecting the heat source and the moving direction of the heat source.

Today, visible light CCD cameras are also used in homes, etc. Such a camera is so configured that sensors for detecting visible light are arranged in a high density on a silicon wafer, and high-density wirings corresponding to the sensing devices are formed on the silicon wafer, thereby realizing a high-resolution camera. It is contemplated that the application of this technique to a heat source detector (infrared camera) may enhance the resolution of the heat source detector.

However, a pyroelectric infrared sensor used in a heat source detector is made of ceramics, etc., and hence it is difficult to integrate such sensors on silicon, thereby producing a problem in that, unlike the above-mentioned visible light CCD camera, it is impossible to arrange sensors in a high density on a silicon wafer and fix them to the wafer. It may be contemplated that infrared sensors are arranged by means of bonding so as to arrange them in a high density. However, this involves drawbacks that the bonding operation requires difficult steps, and that steps such as connecting adjacent infrared sensors to each other and drawing out wirings such as lead wires from infrared ray sensing devices of the infrared sensors must be conducted, thereby making the production process very difficult.

Consequently, a heat source detector such as those shown in FIGS. 1, 2(a) and 2(b) employs a structure wherein infrared sensors are arranged in a low density, and hence its resolution is not very high with the result that such a detector can detect only an approximate position of a heat source. Furthermore, the detector cannot finely determine the moving direction of a heat source. In other words, the detector can conduct only a very rough judgment on the moving direction, i.e., select one of the upper, lower, left, and right directions in the figure, as the moving direction of the heat source.

In order to solve the above-mentioned problems, for example, an infrared camera employing quantum infrared sensors which are made of a semiconductor such as HgCdTe or InSb has been proposed, and practically used in some fields. When such a quantum infrared sensor is to be operated, however, the elements of the sensor must be cooled to a very low temperature by using liquid nitrogen or the like, thereby producing problems in that the detector is bulky, and that the production cost of the detector is high.

SUMMARY OF THE INVENTION

The invention has been conducted in order to solve the problems of the prior art, and therefore it is an object of the invention to provide a heat source detector in which elements of an infrared sensor are not necessary to be cooled to a very low temperature when the detector is to be operated, and which can correctly detect the position of a heat source and the moving direction of the heat source.

The above object of the invention has been achieved by provision of a heat source detector which comprises: an infrared sensor in which plural infrared ray sensing devices are arranged into an array form; and an infrared analyzer which analyzes a detection signal detected by the infrared ray sensing devices, and is characterized in that the infrared analyzer comprises: an infrared intensity detecting unit which detects an infrared intensity for each of the infrared ray sensing devices; and an infrared center of gravity detecting unit which obtains the center of gravity of a heat source emitting infrared rays, from the infrared intensities detected by the infrared intensity detecting unit.

The heat source detector of the invention is characterized also in that the infrared analyzer further comprises a heat source moving direction detecting unit which obtains a moving direction of the heat source which emits infrared rays, from temporal vector displacement of the center of gravity of the heat source, the center of gravity being obtained by the infrared center of gravity detecting unit.

In the invention having the above-mentioned configuration, the infrared intensity detecting unit of the infrared analyzer receives a detection signal from the infrared ray sensing devices of the infrared sensor, and obtains the intensity of infrared rays for each of the infrared ray sensing devices, and the infrared center of gravity detecting unit conducts fine analysis on the intensities of infrared rays for each of the infrared ray sensing devices which are detected by the infrared intensity detecting unit, to accurately obtain the center of gravity of infrared rays.

In the heat source detector wherein the infrared analyzer comprises the heat source moving direction detecting unit, the heat source moving direction detecting unit obtains the moving direction of a heat source from temporal vector displacement of the center of gravity of infrared rays, the center being obtained as a result of fine analysis conducted by the infrared center of gravity detecting unit.

The above and other objects and features of the present invention will be more apparent from the following description taken in conjunction with the accompanying drawings.

BRIEF DESCRIPTION OF THE DRAWINGS

FIG. 3 is a block diagram showing the configuration of the main portion of a heat source detector according to a first embodiment of the invention;

FIG. 4 is a diagram showing infrared ray sensing devices (arrangement state) of an infrared sensor shown in FIG. 3;

FIG. 8 is a diagram showing the arrangement state of infrared ray sensing elements of an infrared sensor used in the heat source detector of another embodiment of the invention.

DETAILED DESCRIPTION OF THE PREFERRED EMBODIMENTS

Figure 1:
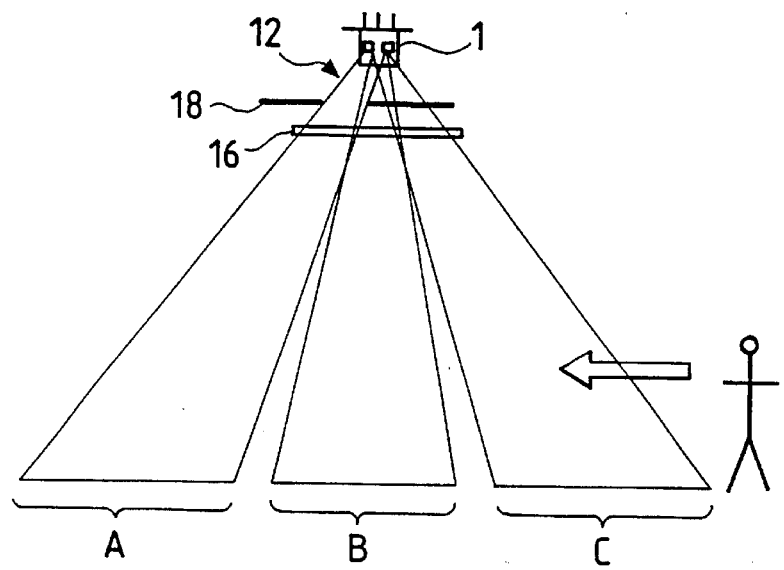
FIG. 1 is a diagram showing an example of a conventionl heat source detector using an infrared sensor.
Figure 2A:
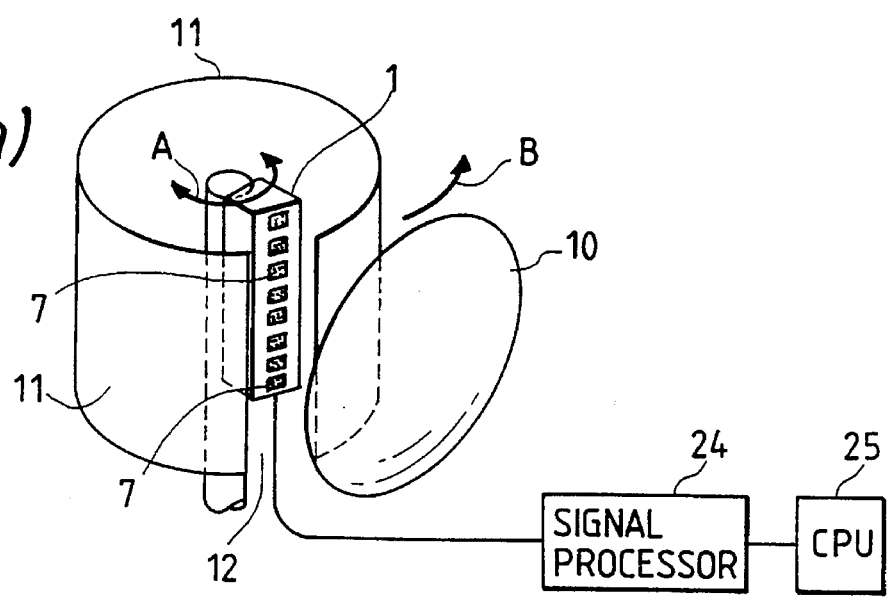
FIGS. 2(a) and 2(b) are diagrams showing another example of a conventional heat source detector using an infrared sensor.
Figure 2B:
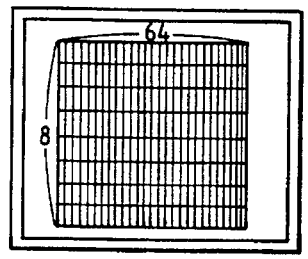

Hereinafter, embodiments of the invention will be described with reference to the accompanying drawings. In the description of the embodiments, the components of the same name as those of the prior art examples are designated by the same reference numerals, and their detailed description is omitted. FIG. 3 is a block diagram showing the configuration of the main portion of a first embodiment of the heat source detector of the invention. In the figure, an infrared lens 10 is disposed at a location on which radiation from a heat source can impinge. The infrared lens 10, a chopper 11, and an infrared sensor 1 are arranged with gaps therebetween. An infrared analyzer 2 which analyzes a detection signal output from the infrared sensor 1 is connected to the infrared sensor 1. When radiation light from a heat source enters the infrared lens 10, the radiation is refracted as indicated by broken lines in FIG. 3 to pass through the aperture 12 of the chopper 11 so that an image of the radiation is formed in the side of the infrared sensor 1.

The infrared sensor 1 is a pyroelectric sensor, and, as shown in FIG. 4, has a structure in which sixteen infrared ray sensing elements 7 are arranged four by four along the vertical and lateral directions, or into a four by four array in the X and Y directions as shown in the figure. As shown in FIG. 3, radiation passing through the infrared lens 10 enters the infrared ray sensing elements 7 of the infrared sensor 1. An infrared image is formed on the infrared ray sensing elements 7 by the infrared lens 10.

The chopper 11 is provided with a driving mechanism which is not shown, so that the chopper 11 is freely slidingly moved by the driving mechanism as indicated by an arrow A in FIG. 3. The movement of the chopper 11 either allows radiation passing through the infrared lens 10 to enter the infrared sensor 1 without obstruction, or prevents the radiation from entering the infrared sensor 1.

The infrared analyzer 2 comprises an infrared intensity detecting unit 3, a heat source position extracting unit 4, an infrared center of gravity detecting unit 5, and a heat source moving direction detecting unit 6. The infrared intensity detecting unit 3 obtains an infrared intensity for each of the infrared ray sensing elements 7. Specifically, at a predetermined period, the infrared intensity detecting unit 3 obtains an infrared intensity for each of the infrared ray sensing elements 7 as shown in FIG. 5(a), and supplies data representative of a distribution diagram of the obtained intensities (voltage distribution diagram) to the heat source position extracting unit 4.

Figure 5A:
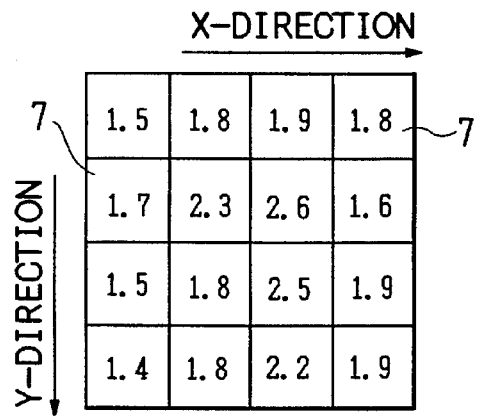
FIG. 5(a) to 5(d) are diagrams showing a method of detecting the center of gravity of infrared rays which is conducted by the heat source detector of the embodiment.

The heat source position extracting unit 4 which has received the data from the infrared intensity detecting unit 3 extracts infrared ray sensing elements 7 wherein the voltage exceeds a given threshold voltage, for example, 2.0 V in the case of FIG. 5(a). The heat source position extracting unit 4 performs binarization so as to define the extracted sensing element as extracted pixels 17, and supplies data in which the infrared intensities of only the extracted pixels 17 are indicated as shown in FIG. 5(c), to the infrared center of gravity detecting unit 5.

Figure 5B:
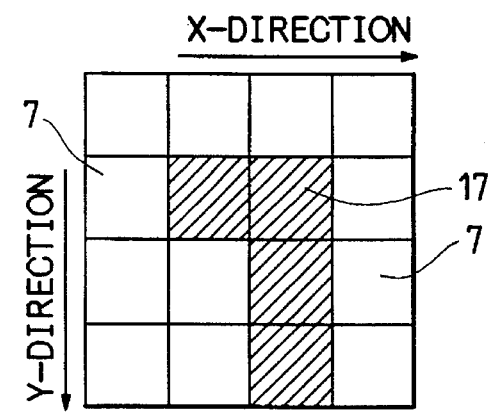
Figure 5C:
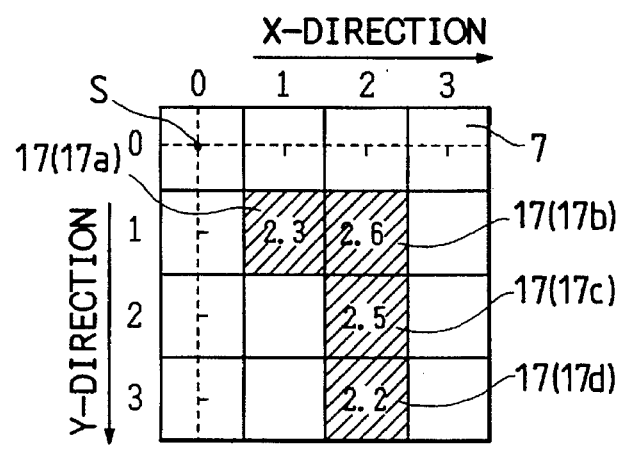

In other words, the heat source position extracting unit 4 first extracts infrared ray sensing elements 7 wherein the voltage exceeds the threshold voltage of 2.0 V from those shown in FIG. 5(a), and discriminates the extracted pixels 17 indicated by the hatched portion in FIG. 5(b), from the other infrared ray sensing elments 7. Therefore, the heat source position extracting unit 4 can determine that radiation of a higher level enters the portions corresponding to the extracted pixels 17, and judge the heat source to have a shape indicated by the hatched portion in the figure. Data indicative of the infrared intensities and positions of the extracted pixels 17 are supplied to the infrared center of gravity detecting unit 5 so that the center of gravity of the infrared rays (center of gravity of the heat source) is detected by the infrared center of gravity detecting unit 5.

The infrared center of gravity detecting unit 5 receives the data from the heat source position extracting unit 4, and obtains the X component $x_G$ and Y component $y_G$ of the center of gravity of the infrared rays on the basis of expressions, for example, (Ex. 1) and (Ex. 2) below which are previously given to the infrared center of gravity detecting unit 5.

$$X_G = \frac{\sum_i (V_i \cdot x_i)}{\sum_i V_i} \quad \text{(Ex. 1)}$$

$$Y_G = \frac{\sum_i (V_i \cdot y_i)}{\sum_i V_i} \quad \text{(Ex. 2)}$$

In (Ex. 1) and (Ex. 2) above, the variable $V_i$ indicates the infrared intensity of an ith extracted pixel 17 in the case where an i number of pixels 17 are extracted by the heat source position extracting unit 4, and $x_i$ and $y_i$ are values of X- and Y-direction components of a distance (address) between a given reference position and the center of the respective extracted pixel 17. When addresses of extracted pixels 17a to 17d are to be obtained while setting the given reference position to be S, X-direction component $x_1$ of the address of the first extracted pixel 17a can be indicated as 1, and Y-direction component $Y_1$ as 1. Similarly, X-direction components $x_2$, $x_3$, and $x_4$ of the addresses of the second, third and fourth extracted pixel 17b, 17c, and 17d can be indicated as 2, 2, and 2, and Y-direction components $y_2$, $y_3$, and $y_4$ as 1, 2, and 3, respectively.

Then, the infrared center of gravity detecting unit 5 sequentially supplies the values of X and Y components $x_G$ and $Y_G$ of the centers of gravity obtained from (Ex. 1) and (Ex. 2), to the heat source moving direction detecting unit 6.

The heat source moving direction detecting unit 6 obtains the moving direction of the heat source from temporal vector displacement of the center of gravity of the infrared rays which is detected by the infrared center of gravity detecting unit 5. More specifically, the chopper 11 is moved so that a process is repeated in which radiation from the heat source is alternatingly enabled and disabled at fixed time intervals to enter the infrared ray sensing elements 7 of the infrared sensor 1. While setting one cycle of the process to be one frame, the heat source moving direction detecting unit 6 obtains X- and Y-direction displacements of the center of gravity of the infrared rays for each frame, and further obtains an angle $\theta$ of the moving direction of the center of gravity with respect to the reference axis of the center of gravity displacement vector, from a total sum $\delta x_{Gsum}$ of the X-direction displacements and a total sum $\delta y_{Gsum}$ of the Y-direction displacements.

Assuming that the center of gravity of an ith frame counted after the detection of the heat source is indicated by $(x_{G(i)}, y_{G(i)})$ and data of N frames exist in the period from the entrance of the heat source into the detection area to the exit of the heat source therefrom, for example, the displacement vector $(\delta x_{Gsum}, \delta y_{Gsum})$ of the center of gravity of the heat source can be calculated by using operation expressions indicated by (Ex. 3) and (Ex. 4) as follows:

$$\delta x_G(i) = x_G(i+1) - x_G(i) \quad \text{(Ex. 3)}$$

$$\delta y_G(i) = y_G(i+1) - y_G(i) \quad \text{(Ex. 4)}$$

A total sum $\delta x_{Gsum}$ of X-direction displacements of the center of gravity of the heat source, and a total sum $\delta y_{Gsum}$ of Y-direction displacements can be obtained from the value of the displacement vector $(\delta x_{G(i)}, \delta y_{G(i)})$ of the center of gravity of the heat source which is obtained from (Ex. 3) and (Ex. 4), and operation expressions indicated by the following (Ex. 5) and (Ex. 6):

$$\delta x_{Gsum} = \sum_{i=1}^{N} \delta x_G(i) \quad \text{(Ex. 5)}$$

$$\delta y_{Gsum} = \sum_{i=1}^{N} \delta y_G(i) \quad \text{(Ex. 6)}$$

When the values of $\delta x_{Gsum}$ and $\delta y_{Gsum}$ obtained in the above are substituted into (Ex. 7) below, $\theta$ can be obtained.

$$\theta = \tan^{-1}\left(\frac{\delta y_{Gsum}}{\delta x_{Gsum}}\right) \quad \text{(Ex. 7)}$$

The operation of the thus configured heat source detector of the embodiment will be described. When radiation from the heat source enters the infrared lens 10 and an infrared image is formed on the infrared ray sensing elements 7 of the infrared sensor 1 as shown in FIG. 3, signals from the sensing elements 7 are sent to the infrared analyzer 2 which in turn conducts a signal analyzing process for each frame in the manner described below.

First, the infrared intensity detecting unit 3 detects the infrared intensity of each of the sensing elements 7, and supplies data indicative of the infrared intensity distribution such as those shown in FIG. 5(a), to the heat source position extracting unit 4. The heat source position extracting unit 4 which has received the data from the infrared intensity detecting unit 3 judges whether the infrared intensity of each of the sensing elements 7 exceeds the threshold voltage of 2.0 V or not. The heat source position extracting unit 4 extracts infrared ray sensing elements 7 wherein the voltage exceeds the threshold voltage as indicated by the hatched portion in FIG. 5(b), and then supplies data indicative of the infrared intensity distribution of the extracted pixels 17, to the infrared center of gravity detecting unit 5. The infrared center of gravity detecting unit 5 which has received the data from the heat source position extracting unit 4 obtains the X component $x_G$ and Y component $Y_G$ of the infrared center of gravity from (Ex. 1) and (Ex. 2) above, and supplies the obtained data for each frame to the heat source moving direction detecting unit 6.

Figure 5D:
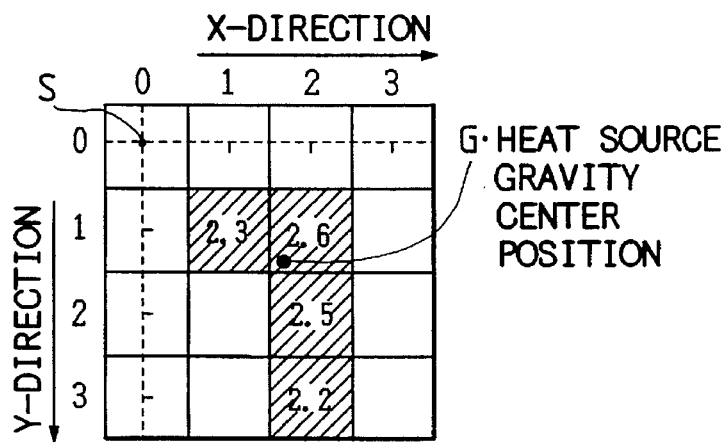

When the data of FIG. 5(c) are substituted into (Ex. 1) and (Ex. 2), $x_G$ and $y_G$ are obtained as follows, and the center of gravity of the heat source is located at a position G in FIG. 5(d).

$$x_G = (1 \times 2.3 + 2 \times 2.6 + 2 \times 2.5 + 2 \times 2.2)/(2.3 + 2.6 + 2.5 + 2.2) = 1.76$$

$$y_G = (1 \times 2.3 + 1 \times 2.6 + 2 \times 2.5 + 3 \times 2.2)/(2.3 + 2.6 + 2.5 + 2.2) = 1.72$$

In this way, it is accurately detected that the center of gravity of the heat source is within the extracted pixels 17a to 17d of the infrared sensor 1, and also that the center of gravity of the infrared rays exists at the position G.

Figure 6:
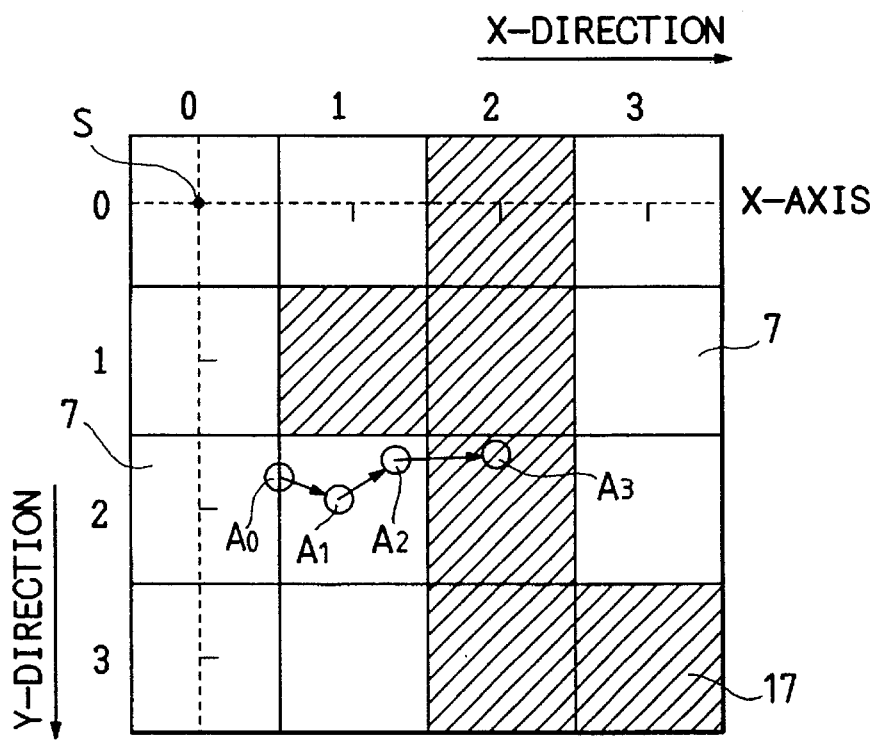
FIG. 6 is a diagram showing a method of detecting the moving direction of a heat source which is conducted by the heat source detector of the embodiment.

When data of the center of gravity of the heat source obtained by the infrared center of gravity detecting unit 5 are sequentially supplied to the heat source moving direction detecting unit 6, the heat source moving direction detecting unit 6 then obtains the angle of the moving direction of the heat source with respect to a reference axis (X-axis) from (Ex. 3) to (Ex. 7), on the basis of the data of the position of the heat source, in the following manner: It is assumed that the center of gravity of the heat source is moved in sequence from a point $A_0$ to a point $A_3$ in FIG. 6 and the extracted pixels 17 exist as indicated by the hatched portion in the figure. The center of gravity $(x_{G1}, y_{G1})$ of the first frame counted after the detection of the heat source exists at the point $A_0$, and therefore is indicated by (0.4, 1.8) in accordance with X and Y components of the address from the reference position S. The center of gravity $(x_{G2}, y_{G2})$ of the second frame exists at the point $A_1$, and therefore is indicated by (1.0, 1.9). Consequently, X component $\delta x_{G(2)}$ of the displacement vector from the center of gravity of the first frame to that of the second frame is obtained from (Ex. 3) as:

$\delta x_{G(2)} = 1.0 - 0.4 = 0.6$ and Y component $\delta y_{G(2)}$ of the displacement vector is obtained from (Ex. 4) as:

$\delta y_{G(2)} = 1.9 - 1.8 = 0.1$

Similarly, X and Y components of the displacement vector for each frame are obtained. The obtained values are listed in Table below.

TABLE

| | X-direction | | Y-direction | |
|---|---|---|---|---|
| Points | Gravity Center | Gravity Center Displacement $(\delta x_G)$ | Gravity Center | Gravity Center Displacement $(\delta y_G)$ |
| $A_0$ | 0.4 | 0.6 | 1.8 | 0.1 |
| $A_1$ | 1.0 | 0.3 | 1.9 | -0.2 |
| $A_2$ | 1.3 | 0.8 | 1.7 | 0.0 |
| $A_3$ | 2.1 | | 1.7 | |

On the basis of the values listed in the table, a total sum $\delta x_{Gsum}$ of X-direction components of the displacement vectors, and a total sum $\delta y_{Gsum}$ of Y-direction components are obtained with using (Ex. 5) and (Ex. 6) as follows:

$\delta x_{Gsum} = 0.6 + 0.3 + 0.8 = 1.7$ $\delta y_{Gsum} = 0.6 + (-0.2) + 0.0 = -0.1$ Therefore, the angle $\theta$ of the moving direction of the heat source with respect to the reference axis in the case where the X-axis is set to be the reference axis of the displacement vector of the center of gravity can be obtained from (Ex. 7) as follows:

$\theta = \tan^{-1}(-0.1/1.7) = -3.4°$

When $\delta x_{Gsum}$ is positive and $\delta y_{Gsum}$ is negative as in the case of the embodiment, it indicates that the center of gravity of the heat source is moved in a lower right direction with respect to the point $A_0$. In the embodiment, it will be noted that the heat source is moved in a lower right direction which is deviated by an angle $\theta$ of 3.4° with respect to point $A_0$. Similarly, when both $\delta x_{Gsum}$ and $\delta y_{Gsum}$ are positive, it indicates that the center of gravity of the heat source is moved in an upper right direction. When both $\delta x_{Gsum}$ and $\delta y_{Gsum}$ are negative, it indicates that the center of gravity of the heat source is moved in a lower left direction. When $\delta x_{Gsum}$ is negative and $\delta y_{Gsum}$ is positive, it indicates that the center of gravity of the heat source is moved in an upper left direction.

According to the embodiment, as a result of the above-described operations, the heat source position extracting unit 4 can determine an approximate position of the heat source and the shape of the heat source, and the infrared center of gravity detecting unit 5 can accurately detect the center of gravity of the heat source with high resolution. On the basis of the accurate data of the center of gravity of the heat source, the heat source moving direction detecting unit 6 obtains the moving direction of the heat source. Even when a low-resolution infrared sensor array is used, therefore, the moving direction of the heat source can be determined with higher accuracy.

The heat source detector of the embodiment uses the pyroelectric infrared sensor 1. Unlike a quantum infrared sensor, a pyroelectric infrared sensor is not necessary to be cooled to a very low temperature. Consequently, the size and cost of the heat source detector are prevented from being increased.

Next, a second embodiment of the heat source detector of the invention will be described. The second embodiment is different from the first embodiment in that the heat source moving direction detecting unit 6 calculates the moving direction of a heat source by a different method, and the rest of the configuration and operation are the same as those of the first embodiment. The heat source moving direction detecting unit 6 of the second embodiment is so configured that the moving direction of a heat source is calculated as described below.

First, the displacement vector $(\delta x_{G(i)}, \delta y_{G(i)})$ of the center of gravity of a heat source of an ith frame counted after the detection of the heat source is obtained from (Ex. 3) and (Ex. 4) described above. Then, an angle $\theta_i$ which is formed by a displacement vector between adjacent frames and a reference axis (X-axis) is obtained from (Ex. 8).

$$\theta(i) = \tan^{-1}\left(\frac{\delta y_{G(i+1)} - \delta y_{G(i)}}{\delta x_{G(i+1)} - \delta x_{G(i)}}\right) \quad \text{(Ex. 8)}$$

Figure 7:
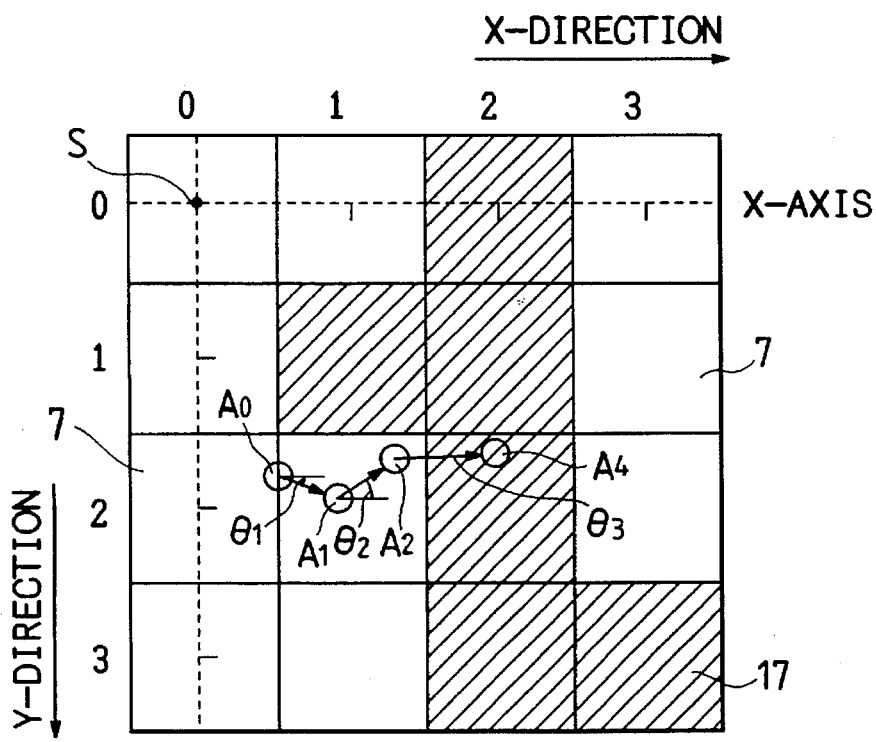
FIG. 7 is a diagram showing a method of detecting the moving direction of a heat source which is conducted by the heat source detector according to a second embodiment of the invention.

When the center of gravity is moved from a point $A_0$ to a point $A_3$ as shown in FIG. 7, for example, the angle $\theta_1$ which is formed by the displacement vector of the first frame, or the displacement vector from $A_0$ to $A_1$ and the X-axis is obtained from (Ex. 8) and the above table as follows:

$\theta_1 = \tan^{-1}(0.6/0.1) = 9.5$

Similarly, the angle $\theta_2$ which is formed by the displacement vector from $A_1$ to $A_2$ and the X-axis is -33.7, and the angle $\theta_3$ which is formed by the displacement vector from $A_2$ to $A_3$ and the X-axis is 0.

When data of N frames are obtained in the period from the entrance of the heat source into the detection area to the exit of the heat source therefrom, the angle $\theta$ of the moving direction of the heat source with respect to the X-axis is obtained from (Ex. 9).

$$\theta = \frac{\sum_i \theta(i)}{N} \quad \text{(Ex. 9)}$$

In the example of FIG. 7, data of three frames from $A_0$ to $A_3$ are obtained. When the heat source is moved as shown in FIG. 7, therefore, the angle $\theta$ of the moving direction of the heat source with respect to the X-axis is obtained as $\theta = (9.6 - 33.7 + 0)/3 = -0.8°$ According to the second embodiment, as a result of the operations similar to those of the first embodiment, the center of gravity of each frame can accurately be detected, and the heat source moving direction detecting unit 6 can accurately obtain the angle $\theta$ of the moving direction of the heat source with respect to the X-axis in the manner described above, thereby attaining the same effects as those of the first embodiment.

The invention is not restricted to the embodiments described above, and may be executed in various manners. Although the infrared sensor 1 in the embodiments is an array sensor in which four infrared ray sensing elements 7 are arranged both in vertical and lateral directions to form an array, for example, the number of the infrared ray sensing elements 7 is not restricted to the above, and the number of sensing devices in the vertical may be equal to or different from that in the lateral direction.

Unlike the first and second embodiments, adjacent infrared ray sensing elements 7 are not required to be made contact with each other, and may be disposed with leaving a gap therebetween as shown in FIG. 8. Even when the infrared ray sensing elements 7 are arranged spaced from each other, the center of gravity of a heat source and the moving direction of the heat source can accurately be detected as far as the infrared detector comprises an infrared analyzer 2 similar to those of the embodiments and operates in a similar manner. Even when the center of gravity of a heat source is in a gap formed between several infrared ray sensing elements 7 as shown in FIG. 8, furthermore, it is possible to accurately detect the position of the center of gravity and the moving direction of the heat source.

In the embodiments, the chopper 11 is disposed between the infrared lens 10 and the infrared sensor 1. The chopper 11 is not always necessary. If the infrared analyzer 2 is configured so as to, at regular time intervals, fetch signals indicative of the infrared intensities detected by the infrared ray sensing elements 7 of the infrared sensor 1, and analyze the signals, the chopper 11 may be omitted.

In the embodiments, the threshold voltage of the heat source position extracting unit 4 is previously set to be 2.0 V, and infrared ray sensing elements 7 wherein the voltage detected by the infrared intensity detecting unit 3 exceeds 2.0 V are extracted as the extracted pixels 17. The threshold voltage of the heat source position extracting unit 4 is not limited to 2.0 V, and may have another adequate value.

In the heat source detector of the invention, the way of obtaining the moving direction of a heat source by means of the heat source moving direction detecting unit 6 is not restricted to those of the embodiments as far as the heat source moving direction detecting unit 6 can obtain the moving direction of a heat source from temporal vector displacement of the center of gravity of infrared rays which is detected by the infrared center of gravity detecting unit.

The embodiments comprise the heat source moving direction detecting unit 6 as an essential component. Alternatively, the heat source moving direction detecting unit 6 may be omitted, and the heat source detector of the invention may be configured so as to detect only the center of gravity of a heat source.

According to the invention, the infrared intensity detecting unit of the infrared analyzer obtains the intensity of infrared rays for each of the infrared ray sensing devices which are arranged into an array form, and the infrared center of gravity detecting unit detects the center of gravity of a heat source which emits infrared rays, from the intensities of infrared rays which are obtained by the infrared intensity detecting unit. Therefore, analysis can finely be conducted on the basis of the data obtained for each of the infrared ray sensing devices, and the center of gravity of infrared rays (center of gravity of the heat source) can accurately be obtained.

In the heat source detector comprising the heat source moving direction detecting unit, the moving direction of the heat source is obtained from accurate temporal vector displacement of the center of gravity of the heat source emitting infrared rays, the center being obtained by the infrared center of gravity detecting unit. Therefore, the moving direction of the heat source can accurately be obtained.

According to the invention, the center of gravity of such a heat source emitting infrared rays, and the moving direction of the heat source can be detected without using a quantum infrared sensor. Therefore, elements of an infrared sensor are not necessary to be cooled to a very low temperature in order to operate the infrared sensor, whereby the size and cost of the detector are prevented from being increased. Even when an infrared sensor having a resolution level which is not so high is used in the heat source detector, infrared rays can be analyzed with high resolution, and hence the center of gravity of a heat source and the moving direction of the heat source can accurately be detected.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A heat source detector, comprising:

an infrared sensor having a plurality of infrared ray sensing elements; and an infrared analyzer for analyzing a detection signal detected by said infrared ray sensing elements, said infrared analyzer including an intensity detecting unit for detecting an intensity for each of said infrared ray sensing elements, and a center of gravity detecting unit for detecting the center of gravity of a heat source emitting the infrared rays from the intensities detected by said intensity detecting unit.

2. A heat source detector according to claim 1, wherein said infrared analyzer further comprises a heat source moving direction detecting unit for detecting a temporal vector displacement of the center of gravity detected by said center of gravity detecting unit to detect a moving direction of the heat source.

3. A heat source detector according to claim 1, wherein said plurality of infrared ray sensing elements are arranged into an array form in x- and y- directions.

4. A heat source detector according to claim 1, wherein said infrared analyzer further comprises a heat source position extracting unit which receives the intensity for each of said infrared ray sensing elements from said intensity detecting unit to extract said infrared ray sensing elements which have a predetermined intensity level or more, and said center of gravity detecting unit detects the center of gravity of the heat source according to the intensities of said infrared ray sensing elements extracted by said heat source position extracting unit.

5. A heat source detector according to claim 1, further comprising a chopper provided in front of said infrared sensor, said chopper being slidably movable for allowing the infrared rays to enter the infrared sensing elements without obstruction and to prevent the infrared rays from entering the infrared sensing elements.

6. A heat source detector according to claim 1, wherein said analyzer receives the infrared intensity for each of said infrared ray sensing elements at regular time intervals.

7. A heat source detector according to claim 1, wherein said infrared ray sensing elements are pyroelectric infrared sensors.

8. A heat source detector according to claim 2, wherein said infrared ray sensing elements are pyroelectric infrared sensors.

9. A heat source detector according to claim 3, wherein said infrared ray sensing elements are pyroelectric infrared sensors.

10. A heat source detector according to claim 4, wherein said infrared ray sensing elements are pyroelectric infrared sensors.

11. A heat source detector according to claim 3, wherein said array has 4 sensing elements arrayed in one of said directions.

12. A heat source detector according to claim 11, wherein said array is a 4×4 array.

13. A heat source detector according to claim 3, wherein said array has 2 sensing elements arrayed in one of said directions.

14. A heat source detector according to claim 3 wherein said array has 3 sensing elements arrayed in one of said directions.

15. A heat source detector according to claim 14, wherein said array is a 2×3 array.

16. A heat source detector according to claim 1, wherein said center of gravity detecting unit determines said center of gravity by determining respective positions of infrared sensing elements whose intensities exceed a predetermined threshold.

17. A heat source detector according to claim 16, wherein said positions of said sensing elements are weighted according to their respective intensities.

18. A heat source detector according to claim 17, wherein said center of gravity detecting unit determines X and Y components of said center of gravity on the basis of respective X and Y coordinates of said sensing elements.

19. A heat source detector according to claim 16, wherein said center of gravity detecting unit determines X and Y components of said center of gravity on the basis of respective X and Y coordinates of said sensing elements.

* * * * *